2,893,998

ANTHRAQUINONE VAT DYES

Mario Francesco Sartori, Wilmington, Del., assignor to E. I. du Pont de Nemours and Company, Wilmington, Del., a corporation of Delaware No Drawing. Application May 20, 1958
Serial No. 736,445

4 Claims. (Cl. 260—316)

This application relates to novel anthraquinone vat dyes. More particularly, this invention deals with novel anthraquinone - carbazole - dinaphthofuran - dione compounds of the formulas

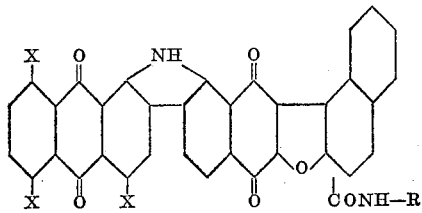

and

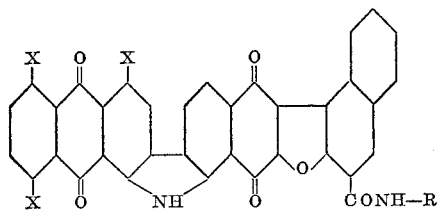

wherein two of the X's are hydrogen, while the third X is hydrogen or a monocyclic aroylamino radical, such as benzamido, o-, m-, or p-toluoylamido, and p-anisoylamido, and R is the radical of an aromatic compound having not more than 10 C-atoms and being free of water-solubilizing groups.

Such compounds may be designated generically as the carbazoles resulting from ring-closure of anthrimides of the general formula

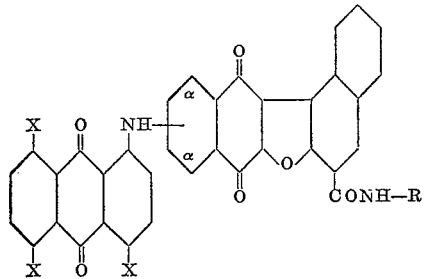

wherein X and R have the same meaning as above, and wherein the NH group of the anthraquinone radical is attached in an α-position of the naphthoquinone nucleus.

It is an object of this invention to produce novel anthraquinone vat dyes which dye cotton in red-brown shades of good fastness properties, particularly light-fastness, excellent vat stability at elevated temperatures, and good build-up qualities on cellulosic fiber, but which do not stain nylon.

My novel compounds of the above formula may be prepared by condensing an alpha-chloro (or bromo)-anthaquinone, which may carry a monocyclic aroylamino group in one of the remaining alpha positions, with an amino-dinaphthofuran-dione of the formula

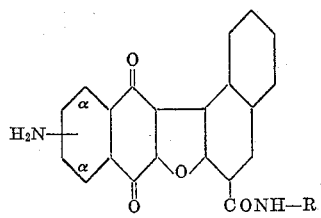

wherein R has the same meaning as above and wherein the $NH_2$ group is located in an α-position of the naphthoquinone radical, to give the corresponding anthraquinonyl-amino-dinaphthofuran-dione, and then ring-closing the latter to the corresponding carbazole compound.

The said aminodinaphthofuran diones may be synthesized by the general methods described in my copending application Serial No. 715,489 (filed February 17, 1958). In other words, one may start with 2,3-dichloro-5-nitro-1,4-naphthoquinone, condense same (by heating in the presence of an acid absorbing agent such as sodium acetate or pyridine, in a liquid medium which is inert toward the reaction) with the selected 3-hydroxy-2-naphthoic acid arylide, and then reduce the nitro dinaphthofuran compound thus obtained to the corresponding amine. Or, one may start directly with 2,3-dichloro-5-amino-1,4-naphthoquinone and condense same, as above, with the chosen 3-hydroxy-2-naphthoic acid arylide.

As illustrations of convenient hydroxy-naphthoic acid arylides suitable for the above syntheses may be mentioned 3-hydroxy-2-naphthanilide,
2'-(or 4'-) chloro-3-hydroxy-2-naphthanilide,
3-hydroxy-2-naphtho-o-toluidide,
3-hydroxy-2-naphtho-2,4-xylidide,
3-hydroxy-2-naphtho-o-anisidide,
3-hydroxy-N-1(or 2)-naphthyl-2-naphthamide, and
4'-(or 5')chloro-3-hydroxy-2-naphtho-o-toluidide.

The condensation and ring-closure may follow known general procedure for these operations. For instance, the condensation may be achieved by heating the named compounds in nitrobenzene, in the presence of sodium carbonate as acid absorbing agent and copper acetate as catalyst; the ring-closure may be effected by heating the anthaquinonylamino compound formed in the condensation step, in nitrobenzene, in the presence of aluminum chloride, and then drowning the reaction mass in water.

The synthesis may also follow other, per se known variations, for instance by choosing initial materials in which the amino and halogen substituents are reversed. For instance, one may start with a 1-amino-anthraquinone which optionally carries an aroylamino substituent in one of the remaining alpha-positions, and condense same with a dinaphthofuran-dione compound of the formula

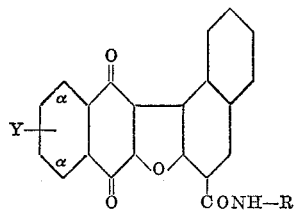

wherein R has the same meaning as above, while Y is a halogen such as chloro or bromo. Such halogeno compounds may be prepared by Sandmeyer's reaction from the corresponding amino compounds above discussed.

By virtue of their mode of synthesis, the initial nitro or amino dinaphthofuran compounds, the intermediate anthraquinonyl amino compounds, and the final carbazole dyes generally consist of mixtures of two isomers, whose formulas, in the case of the final carbazoles, have been indicated hereinabove. In the nitro stage, these isomers can be separated by their differential solubilities in convenient solvents, for instance sulfuric acid. After separation, each nitro isomer may be individually reduced to the amino stage, condensed with an alpha halogenoanthraquinone to give an anthrimide, and then ring-closed to give the carbazole vat dye corresponding to said initial single isomer. For practical purposes, however, such separation is not necessary, inasmuch as the mixed final carbazole has all the properties and good qualities that are sought in a vat dye of this nature.

Without limiting this invention, the following examples are given to illustrate my preferred mode of operation. Parts mentioned are by weight.

PART I.—PREPARATION OF THE INTERMEDIATE (A) *Nitro-8,13-dioxodinaphtho[2,1-2',3']furan-6-carboxanilide*

2,3 - dichloro - 5 - 5 nitro - 1,4 - naphthoquinone (1.3 parts) was added to a solution of 3-hydroxy-2-naphthanilide (1.3 parts) in pyridine (15 parts). A dark brown suspension was formed and the temperature rose to 37° C. The mixture was then heated to 100°–110° C. in about 1 hour and agitated at this temperature for an additional 3 hours. After stirring 12 hours at room temperature the orange precipitate was collected and washed with ethanol. This crude, after repeated extractions with hot water, gave 1.8 parts of orange powder of M.P. above 300° C. This product is believed to be a mixture of 9-nitro- and 12-nitro-8,13-dioxodinaphtho[2,1-2',3']-furan-6-carboxanilide of the structure.

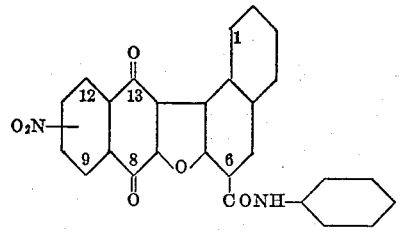

(B) *Amino-8,13-dioxodinaphtho[2,1-2',3']furan-6-carboxanilide*

9 parts of the mixture of nitro-8,13-dioxodinaphtho-[2,1-2',3']furan-6-carboxanilide as obtained in procedure A were added to a stirred solution of sodium hydrosulfite (27 parts) and 30% aqueous sodium hydroxide (90 parts) in water (200 parts). After 15 minutes at 35° C., the slurry changed to a clear solution. The agitation at 35°–40° C. was continued for 1 hour, then the solution was filtered and the filtrate was oxidized with air.

The precipitate, dried and crystallized from nitrobenzene, gave dark red crystals of M.P. above 350° C. The absorption maxima of this product in o-dichlorobenzene are located at 452 and 512 millimicrons.

*Analysis.*—Calculated for $C_{27}H_{16}O_4N_2$: C, 74.8; H, 3.7; N, 6.8%. Found: C, 74.7; H, 3.9; N, 7.0%.

This amino product dyes cotton from an alkaline sodium hydrosulfite vat, in red shades of good fastness properties.

PART II.—SYNTHESIS OF VAT DYE

EXAMPLE 1

(C) *Preparation of anthrimide*

A mixture of 8.6 parts of amino-8,13-dioxodinaphtho [2,1-2',3']furan-6-carboxanilide, prepared as described in procedure B, 7.2 parts of 1-benzamido-4-chloroanthraquinone, 4.0 parts of sodium carbonate, 0.2 part of copper acetate and 65 parts of nitrobenzene was heated at 185°–190° C. for 10 hours with stirring. After cooling to 90° C., the dark violet crystals were collected on a filter and washed with nitrobenzene, ethanol and hot water in turn, and dried. The product thus obtained is soluble in concentrated sulfuric acid with a green-olive coloration.

(D) *Carbazolation*

10 parts of the anthrimide prepared in procedure C were suspended in 120 parts of dry nitrobenzene and treated portionwise with 40 parts of aluminum chloride while agitating and keeping the temperature between 55° and 65° C. The reaction mass was stirred at 65° C. for one-half hour and then drowned in cold water. The mixture was slurried for 16 hours at room temperature. The aqueous layer was decanted off, the nitrobenzene layer containing the dye was washed with 500 parts of water by decantation, made alkaline with sodium carbonate and steam distilled to remove the solvent. The crude product was filtered off, ground, washed thoroughly with water, and purified by dichromation and bleaching by well-known methods.

The product so obtained gives a blue solution in concentrated sulfuric acid and an orange-brown solution in an alkaline hydrosulfite vat, from which cotton is dyed in brown shades of good fastness properties.

This dye is believed to be a mixture of the cis and trans isomers having the following formulas,

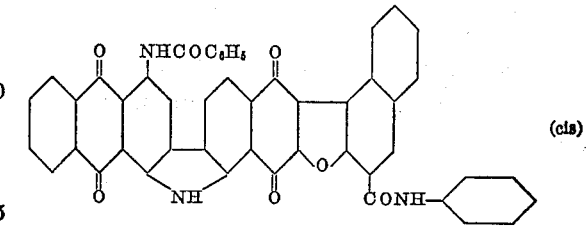

and

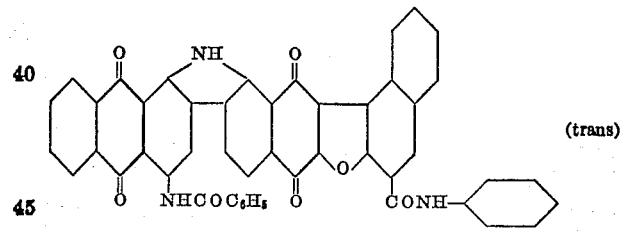

EXAMPLES 2 TO 4

Procedures C and D of Example 1 are repeated except that the 7.2 parts of 1-benzamido-4-chloroanthraquinone therein named are replaced, respectively, by the following intermediates and quantities:

Example 2: 4.8 parts of 1-chloroanthraquinone;
Example 3: 7.2 parts of 1 - benzamido - 5 - chloroanthraquinone;
Example 4: 7.2 parts of 1 - benzamido - 8 - chloroanthraquinone.

The dyes thus obtained dye cotton brown shades of good fastness properties.

In a manner similar to the above examples, 2,3-dichloro-5-nitro-1,4-naphthoquinone may be reacted with any of the other 3-hydroxy-2-naphthoic acid arylides named above, and the resulting nitro compounds may be reduced to the amino stage, condensed with any of the halogeno-anthraquinones indicated in Examples 1 to 4, and ring-closed, to produce vat dyes. The latter dye cotton in brown shades of good fastness properties and are in general similar in appearance and qualities to the product obtained in procedure D of Example 1.

The same colors as in Examples 1 to 4 above may also be prepared by condensing 1-amino-anthraquinone or its 4-, 5- or 8-benzamido derivative with the chloro-8,13-dioxodinaphtho[2,1-2',3']furan-6-carboxanilide product, obtained as described in Example 5 of my copending application Serial No. 728,563 (filed April 15, 1958) and ring-closing the anthrimides thus obtained according to procedure D above.

Many other variations in the details of the above examples will be readily apparent to those skilled in this art.

I claim as my invention:
1. A vat dye being a mixture of the two isomeric compounds of the formulas

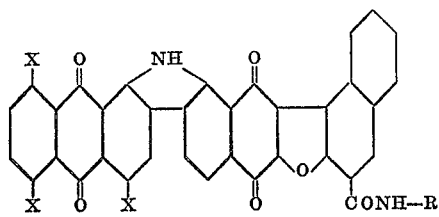

and

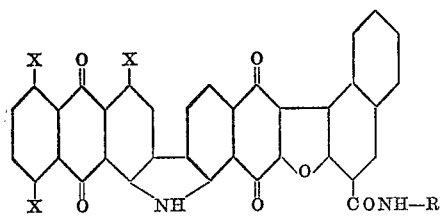

wherein two of the X's represent hydrogen, the third X is a member of the group consisting of hydrogen and homocyclic, monocyclic aroylamino radicals, while R is the radical of a homocyclic aromatic compound having not more than 10 C-atoms and being free of water-solubilizing groups.

2. A vat dye being a mixture of the two isomeric compounds of the formulas

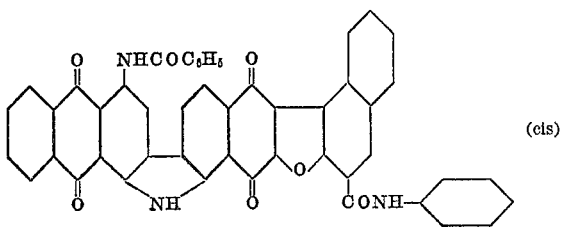

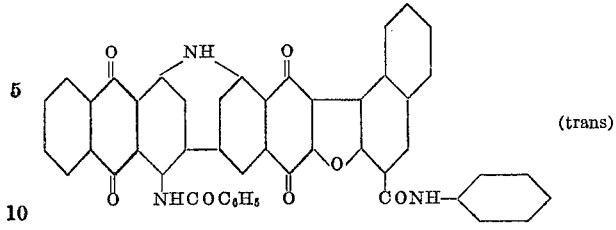

3. The process of producing a vat dye, which comprises subjecting to ring-closure, by treatment with anhydrous aluminum chloride, an anthraquinonyl-amino-dinaphthofuran-dione of the formula

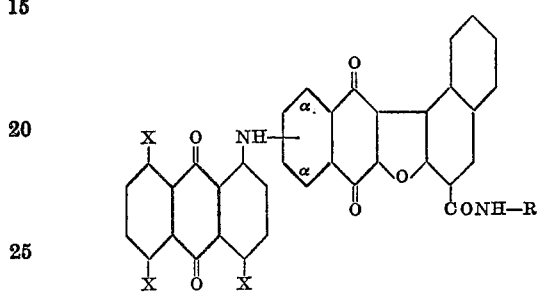

wherein two of the X's represent hydrogen, the third X is a member of the group consisting of hydrogen and homocyclic monocyclic aroylamino radicals, R is the radical of a homocyclic aromatic compound having not more than 10 C-atoms and being free of water-solubilizing groups, and the N-atom of the NH group in the naphthoquinone nucleus is attached thereto in one of the α-positions, and recovering the resulting anthraquinone-carbazole-dinaphthofuran-dione compound.

4. A process comprising reacting 1-benzoyl-amino-4-chloranthraquinone with a mixture of 9-amino and 12-amino - 8,13 - dioxodinaphtho[2,1 - 2',3']furan - 6 - carboxanilide in the presence of soda ash and copper, and then carbazole ring closing the resulting secondary amine by treatment with anhydrous aluminum chloride.

References Cited in the file of this patent
UNITED STATES PATENTS

| | | |
|---|---|---|
| 2,407,704 | Kern | Sept. 17, 1946 |
| 2,459,424 | Hauser et al. | Jan. 18, 1949 |
| 2,473,949 | Hauser et al. | June 21, 1949 |
| 2,473,950 | Hauser et al. | June 21, 1949 |
| 2,768,172 | Schmidt-Nickels | Oct. 23, 1956 |
| 2,813,875 | Schmidt-Nickels et al. | Nov. 19, 1957 |

UNITED STATES PATENT OFFICE
Certificate of Correction

Patent No. 2,893,998                                                       July 7, 1959

Mario Francesco Sartori

It is hereby certified that error appears in the printed specification of the above numbered patent requiring correction and that the said Letters Patent should read as corrected below.

Column 1, lines 19 to 26, the extreme right-hand portion of the formula should appear as shown below instead of as in the patent:

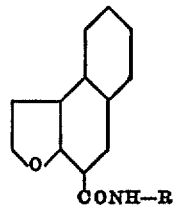

column 3, line 22, for "2,3-dichloro-5-5 nitro-" read — 2,3-dichloro-5-nitro- —.

Signed and sealed this 17th day of November 1959.

[SEAL]

Attest:
KARL H. AXLINE,
*Attesting Officer.*

ROBERT C. WATSON,
*Commissioner of Patents.*